US010552711B2

(12) United States Patent
Lim et al.

(10) Patent No.: US 10,552,711 B2
(45) Date of Patent: Feb. 4, 2020

(54) APPARATUS AND METHOD FOR EXTRACTING SOUND SOURCE FROM MULTI-CHANNEL AUDIO SIGNAL

(71) Applicant: Electronics and Telecommunications Research Institute, Daejeon (KR)

(72) Inventors: Woo-taek Lim, Daejeon (KR); Seung Kwon Beack, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/203,668

(22) Filed: Nov. 29, 2018

(65) Prior Publication Data

US 2019/0180142 A1 Jun. 13, 2019

(30) Foreign Application Priority Data

Dec. 11, 2017 (KR) .................. 10-2017-0169666

(51) Int. Cl.
*G06K 9/62* (2006.01)
*G06N 3/02* (2006.01)
*G06F 16/683* (2019.01)
*G10L 19/008* (2013.01)

(52) U.S. Cl.
CPC ......... *G06K 9/6232* (2013.01); *G06F 16/685* (2019.01); *G06N 3/02* (2013.01); *G10L 19/008* (2013.01)

(58) Field of Classification Search
CPC ....... G10L 19/008; G06N 3/02; G06F 16/685; G06K 9/6232
See application file for complete search history.

(56) References Cited

U.S. PATENT DOCUMENTS

| | | | |
|---|---|---|---|
| 9,008,440 B2 | 4/2015 | Kim et al. | |
| 2007/0223711 A1* | 9/2007 | Bai | G01H 3/125 381/56 |
| 2017/0249957 A1 | 8/2017 | Park et al. | |
| 2017/0300788 A1 | 10/2017 | Cao et al. | |

FOREIGN PATENT DOCUMENTS

KR 10-2017-0096083 A 8/2017

OTHER PUBLICATIONS

Huang, Po-Sen, et al. "Deep Learning For Monaural Speech Separation." *2014 IEEE International Conference on Acoustics, Speech and Signal Processing (ICASSP)*, 2014 (pp. 1562-1566).

* cited by examiner

*Primary Examiner* — Regina N Holder
(74) *Attorney, Agent, or Firm* — NSIP Law

(57) ABSTRACT

Disclosed is an apparatus and method for extracting a sound source from a multi-channel audio signal. A sound source extracting method includes transforming a multi-channel audio signal into two-dimensional (2D) data, extracting a plurality of feature maps by inputting the 2D data into a convolutional neural network (CNN) including at least one layer, and extracting a sound source from the multi-channel audio signal using the feature maps.

10 Claims, 4 Drawing Sheets

APPARATUS AND METHOD FOR EXTRACTING SOUND SOURCE FROM MULTI-CHANNEL AUDIO SIGNAL

CROSS-REFERENCE TO RELATED APPLICATION(S)

This application claims the priority benefit of Korean Patent Application No. 10-2017-0169666 filed on Dec. 11, 2017, in the Korean Intellectual Property Office, the disclosure of which is incorporated herein by reference for all purposes.

BACKGROUND

1. Field

One or more example embodiments relate to an apparatus and method for extracting a sound source from a multi-channel audio signal.

2. Description of Related Art

Sound source extraction technology is technology which extracts at least one audio signal before mixture from a multi-channel audio signal in which a plurality of sound sources is mixed.

The sound source extraction technology may be used to separate only a voice sound source from the original audio signal and utilize the sound source in the field of voice enhancement or, conversely, to remove a sound source and utilize a remaining signal in the field of karaoke accompaniment.

A center channel extraction method, which is a conventional sound source extracting method, may extract a sound source using volume difference and phase difference information between stereo channels. In detail, the center-channel extraction method may calculate the volume, phase difference between the channels through respective operations of signal components, of an audio signal transformed using a short-time Fourier transform (STFT) process, on frequency and time axes. In addition, the center-channel extraction method may extract a signal of a center channel using a result of the calculation and a predetermined reference value.

Such a sound source extracting method based on a reference value of a time-frequency domain signal may extract a sound source using a predetermined reference value, and thus a component of a center sound source may not be extracted, or ambient sound sources may be included during a process of extracting a center sound source.

Accordingly, a method of extracting a major object audio signal present independently or in common in a plurality of channels is needed.

SUMMARY

An aspect provides an apparatus and method for extracting a sound source from a multi-channel audio signal using an independent component or a common component of feature maps extracted respectively from a plurality of audio channels through a convolution process.

According to an aspect, there is provided a sound source extracting method including transforming a multi-channel audio signal into two-dimensional (2D) data, extracting a plurality of feature maps by inputting the 2D data into a convolutional neural network (CNN) including at least one layer, and extracting a sound source from the multi-channel audio signal using the feature maps.

The transforming may include analyzing the multi-channel audio signal on a frame-by-frame basis, and transforming the multi-channel audio signal into the 2D data based on a result of the analyzing.

The CNN may be configured to extract the feature maps respectively from channels of the multi-channel audio signal transformed into the 2D data, and merge and output the feature maps extracted from the plurality of channels.

The extracting of the sound source may include predicting a major component included in common in the feature maps by performing an operation between the feature maps, and extracting the sound source from the multi-channel audio signal based on the predicted major component.

The extracting of the sound source may include predicting an independent sound source included only in a single channel among the feature maps by performing an operation between the feature maps, and extracting the predicted independent sound source from the multi-channel audio signal.

According to another aspect, there is provided a sound source extracting apparatus including a 2D signal transformer configured to transform a multi-channel audio signal into 2D data and input the 2D data into a CNN, the CNN including at least one layer, the CNN configured to extract a plurality of feature maps from the 2D data, and a sound source extractor configured to extract a sound source from the multi-channel audio signal using the feature maps.

The 2D signal transformer may be configured to analyze the multi-channel audio signal on a frame-by-frame basis, and transform the multi-channel audio signal into the 2D data based on a result of the analyzing.

The CNN may be configured to extract the feature maps respectively from channels of the multi-channel audio signal transformed into the 2D data, and merge and output the feature maps extracted from the plurality of channels.

The sound source extractor may be configured to predict a major component included in common in the feature maps by performing an operation between the feature maps, and extract the sound source from the multi-channel audio signal based on the predicted major component.

The sound source extractor may be configured to predict an independent sound source included only in a single channel among the feature maps by performing an operation between the feature maps, and extract the predicted independent sound source from the multi-channel audio signal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. A sound source extracting method according to an example embodiment may be performed by a sound source extracting apparatus.

Figure 1:
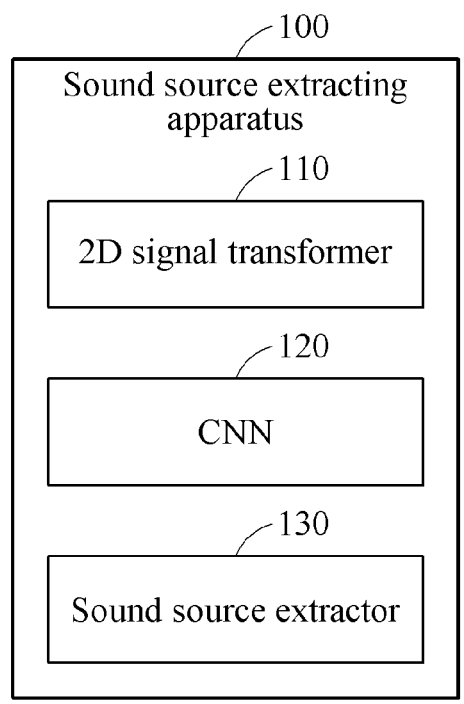
FIG. 1 is a block diagram illustrating a sound source extracting apparatus according to an example embodiment.

FIG. 1 is a block diagram illustrating a sound source extracting apparatus according to an example embodiment.

Referring to FIG. 1, a sound source extracting apparatus 100 may include a two-dimensional (2D) signal transformer 110, a convolutional neural network (CNN) 120, and a sound source extractor 130. In this example, the 2D signal transformer 110, the CNN 120, and the sound source extractor 130 may be modules configured to perform a program included in a single process or different processes.

The 2D signal transformer 110 may transform a multi-channel audio signal into 2D data and input the 2D data into the CNN 120. In this example, the 2D signal transformer 110 may analyze the multi-channel audio signal on a frame-by-frame basis and transform the multi-channel audio signal into the 2D data based on a result of the analyzing. For example, the 2D signal transformer 110 may transform the multi-channel audio signal into the 2D data using one of Fast Fourier Transform (FFT), Constant Q Transform (CQT), and Wavelet. In addition, the 2D signal transformer 110 may transform the multi-channel audio signal into the 2D data using any of methods of representing an audio signal as a 2D signal, in addition to the examples described above.

The CNN 120 may be a network used principally in the field of image recognition, generation, and interpretation.

The CNN 120 may include at least one layer and extract a plurality of feature maps by performing convolution using a mask fixed to input 2D data. In this example, the size of 2D data may be determined based on a plurality of conditions such as a frame length, a frequency resolution, and a user input. The CNN 120 may perform at least one of method such as convolution, sub-sampling, Activation, Drop out, Softmax, and normalization.

Further, the CNN 120 may extract the feature maps respectively from channels of the multi-channel audio signal transformed into the 2D data, and merge and output the feature maps extracted from the plurality of channels. In detail, the CNN 120 may configure the respective layers by alternately performing the convolution operation and the sub-sampling operation. The CNN 120 may extract the feature maps from the 2D data using the layers and classify a sound source from the audio signal by merging the feature maps. In this example, the CNN 120 may generate the feature maps by extracting edge components from the multi-channel audio signal transformed into the 2D data. In this example, a region in which an edge component is detected in the multi-channel audio signal is a region in which a component of the sound source is present. Thus, when the 2D data passes through the CNN 120, the feature maps may be extracted from a portion in which major components of the sound source are present.

The sound source extractor 130 may extract a sound source from the multi-channel audio signal using the feature maps extracted by the CNN 120. In this example, the sound source extractor 130 may predict a major component included in common in the feature maps by performing an operation between the feature maps, and extract the sound source from the multi-channel audio signal based on the predicted major component.

Further, the sound source extractor 130 may predict an independent sound source included only in a single channel among the feature maps by performing an operation between the feature maps, and extract the predicted independent sound source from the multi-channel audio signal. In this example, the operation between the feature maps performed by the sound source extractor 130 may be one of multiplication, difference, and summation.

In an example in which major components are predicted through multiplication between the feature maps, major components may have relatively great values when compared to independent sound source in a merged feature map generated by multiplying the feature maps. Thus, if the sound source extractor 130 normalizes and restores the merged feature map, each component of the merged feature map may have a value between "0" and "1". In this example, a major component may have a value approximate to "1" in the merged feature map, and an independent sound source may have a value approximate to "0" and thus, serve as a soft mask.

Thus, the sound source extractor 130 may normalize and restore the merged feature map generated by multiplying the feature maps, thereby extracting a sound source including the major component.

Further, the sound source extractor 130 may determine, to be major components, components having values greater than or equal to a predetermined threshold in the merged feature map generated by multiplying the feature maps and restore only the components having values greater than the threshold, thereby generating a feature map formed of "1" and "0". The feature map formed of "1" and "0" may serve as a binary mask including "1"s as major components, and thus the sound source extractor 130 may extract a sound source including a major component by restoring the feature map formed of "1" and "0".

The sound source extracting apparatus 100 may extract a sound source from a multi-channel audio signal using an independent component or a common component of the feature maps extracted respectively from a plurality of audio channels through a convolution process.

Figure 2:
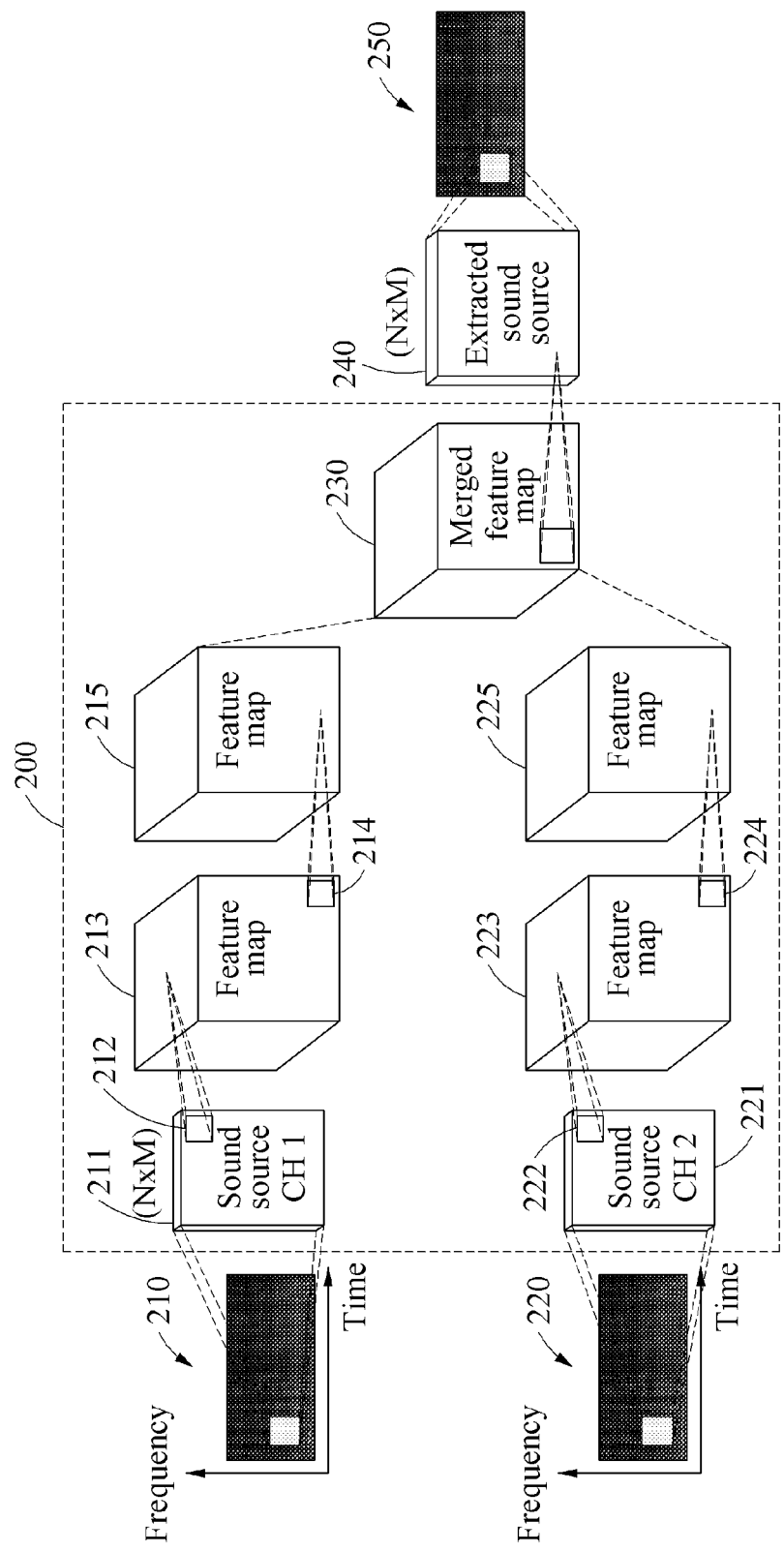
FIG. 2 illustrates an example of a sound source extracting process according to an example embodiment.

FIG. 2 illustrates an example of a sound source extracting process according to an example embodiment.

Referring to FIG. 2, the 2D signal transformer 110 may analyze a first frame 210 of a multi-channel audio signal and input channel-1 2D data 211 into the CNN 120 based on a result of the analyzing. Further, the 2D signal transformer 110 may analyze a second frame 220 of the multi-channel audio signal and input channel-2 2D data 221 into the CNN 120 based on a result of the analyzing.

A convolutional layer 200 of the CNN 120 may generate a feature map 213 by extracting an edge component 212 from the channel-1 2D data 211. Then, the convolutional layer 200 may generate a feature map 215 by extracting an edge component 214 from the feature map 213.

In addition, the convolutional layer 200 may generate a feature map 223 by extracting an edge component 222 from the channel-2 2D data 221. Then, the convolutional layer 200 may generate a feature map 225 by extracting an edge component 224 from the feature map 223.

The convolutional layer 200 may generate and output a merged feature map 230 into which the feature map 215 and the feature map 225 are merged.

In this example, the sound source extractor 130 may extract a sound source 240 by searching the merged feature map 230 for components included in common in the feature map 215 and the feature map 225. Since the extracted sound source 240 is 2D data, the sound source extractor 130 may transform the extracted sound source 240 into an audio signal 250 and output the audio signal 250.

Figure 3:
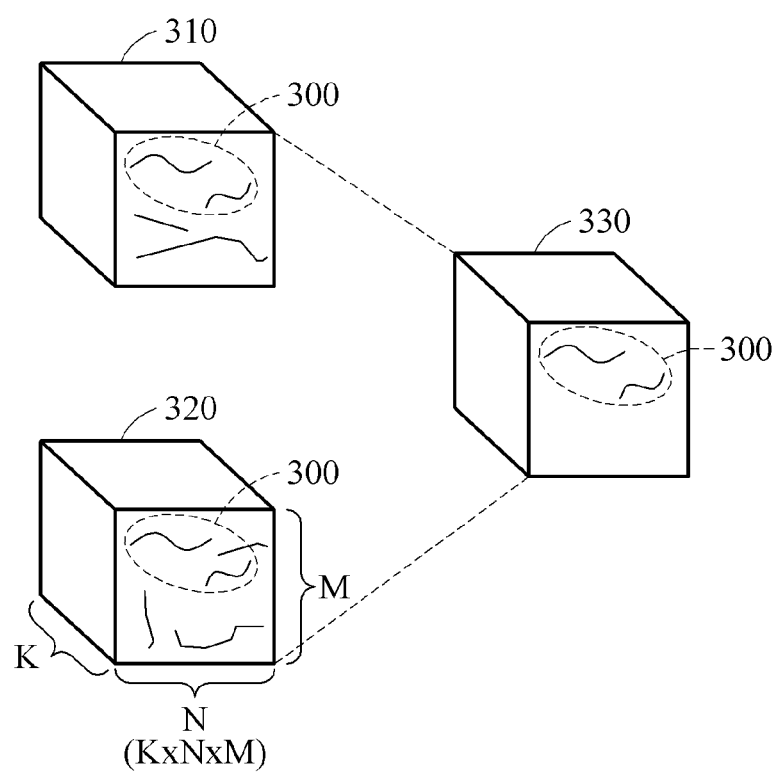
FIG. 3 illustrates an example of a merge layer according to an example embodiment.

FIG. 3 illustrates an example of a merge layer according to an example embodiment.

Referring to FIG. 3, a first feature map 310 and a second feature map 320 extracted by the CNN 120 may include a plurality of features. A merged feature map 330 generated by the CNN 120 merging the first feature map 310 and the second feature map 320 may include only features 300 included in common in the first feature map 310 and the second feature map 320, among the features included in the first feature map 310 and the second feature map 320.

Thus, the sound source extractor 130 may search for the features 300 included in the merged feature map 330, thereby searching for the features included in common in the first feature map 310 and the second feature map 320.

Figure 4:
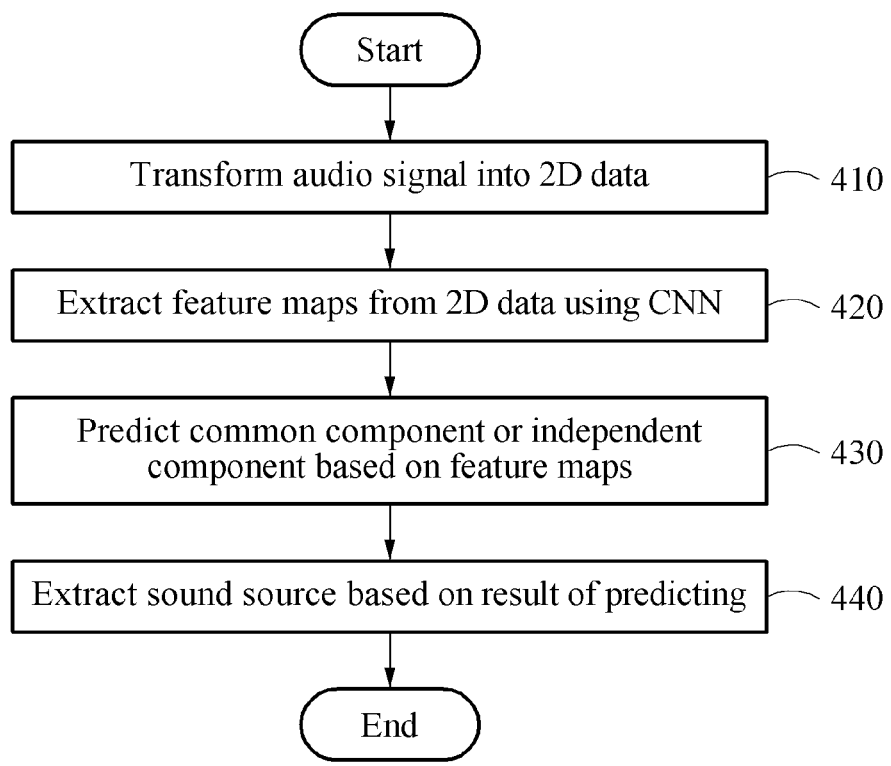
FIG. 4 is a flowchart illustrating a sound source extracting method according to an example embodiment.

FIG. 4 is a flowchart illustrating a sound source extracting method according to an example embodiment.

Referring to FIG. 4, in operation 410, the 2D signal transformer 110 may transform a multi-channel audio signal into 2D data. In this example, the 2D signal transformer 110 may analyze the multi-channel audio signal on a frame-by-frame basis and transform the multi-channel audio signal into the 2D data based on a result of the analyzing.

In operation 420, the 2D signal transformer 110 may input the 2D data into the CNN 120. In this example, the CNN 120 may extract a plurality of feature maps from the input 2D data.

In operation 430, the sound source extractor 130 may predict a major component included in common in the feature maps or an independent sound source included only in a single channel among the feature maps by performing an operation between the feature maps.

In operation 440, the sound source extractor 130 may extract a sound source from the multi-channel audio signal based on the major component or independent sound source predicted in operation 430.

Meanwhile, the method may be written as a computer-executable program and implemented using various recording media such as a magnetic storage medium, an optical reading medium, and a digital storage medium.

According to example embodiments, it is possible to extract a sound source from a multi-channel audio signal using an independent component or a common component of feature maps extracted respectively from a plurality of audio channels through a convolution process.

The components described in the exemplary embodiments of the present invention may be achieved by hardware components including at least one Digital Signal Processor (DSP), a processor, a controller, an Application Specific Integrated Circuit (ASIC), a programmable logic element such as a Field Programmable Gate Array (FPGA), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A sound source extracting method, the method comprising:
transforming a multi-channel audio signal into two-dimensional (2D) data;
extracting feature maps by inputting the 2D data into a convolutional neural network (CNN) including at least one layer, the extracting of the feature maps comprising:
extracting edge components respectively from the multi-channel audio signal transformed into the 2D data to extract the feature maps, and generating a merged feature map by merging the feature maps; and extracting a sound source from the multi-channel audio signal by searching the merged feature map.

2. The sound source extracting method of claim 1, wherein the transforming comprises:

analyzing the multi-channel audio signal on a frame-by-frame basis, and transforming the multi-channel audio signal into the 2D data based on a result of the analyzing.

3. The sound source extracting method of claim 1, wherein a region in which an edge component is detected in the multi-channel audio signal is a region in which a component of the sound source is present.

4. The sound source extracting method of claim 1, wherein the extracting of the sound source comprises:

predicting a major component included in common in the feature maps by performing an operation between the feature maps, and extracting the sound source from the multi-channel audio signal based on the predicted major component.

5. The sound source extracting method of claim 1, wherein the extracting of the sound source comprises:

predicting an independent sound source included only in a single channel among the feature maps by performing an operation between the feature maps, and extracting the predicted independent sound source from the multi-channel audio signal.

6. A sound source extracting apparatus, comprising:

a two-dimensional (2D) signal transformer configured to transform a multi-channel audio signal into 2D data and input the 2D data into a convolutional neural network (CNN);

the CNN including at least one layer and configured to extract feature maps from the 2D data, the CNN being further configured to:

extract edge components respectively from the multi-channel audio signal transformed into the 2D data to extract the feature maps, and generate a merged feature map by merging the feature maps; and a sound source extractor configured to extract a sound source from the multi-channel audio signal by searching the merged feature map.

7. The sound source extracting apparatus of claim 6, wherein the 2D signal transformer is configured to:

analyze the multi-channel audio signal on a frame-by-frame basis, and transform the multi-channel audio signal into the 2D data based on a result of the analyzing.

8. The sound source extracting apparatus of claim 6, wherein a region in which an edge component is detected in the multi-channel audio signal is a region in which a component of the sound source is present.

9. The sound source extracting apparatus of claim 6, wherein the sound source extractor is configured to:

predict a major component included in common in the feature maps by performing an operation between the feature maps, and extract the sound source from the multi-channel audio signal based on the predicted major component.

10. The sound source extracting apparatus of claim 6, wherein the sound source extractor is configured to:

predict an independent sound source included only in a single channel among the feature maps by performing an operation between the feature maps, and extract the predicted independent sound source from the multi-channel audio signal.

* * * * *